(12) United States Patent
Jeong

(10) Patent No.: US 9,674,329 B2
(45) Date of Patent: Jun. 6, 2017

(54) MOBILE COMMUNICATION TERMINAL FOR RECEIVING CALL WHILE RUNNING APPLICATION AND METHOD FOR SAME

(71) Applicant: Han Uk Jeong, Seoul (KR)

(72) Inventor: Han Uk Jeong, Seoul (KR)

( * ) Notice: Subject to any disclaimer, the term of this patent is extended or adjusted under 35 U.S.C. 154(b) by 0 days.

(21) Appl. No.: 14/759,652

(22) PCT Filed: Jan. 8, 2014

(86) PCT No.: PCT/KR2014/000216
§ 371 (c)(1),
(2) Date: Jul. 8, 2015

(87) PCT Pub. No.: WO2014/109555
PCT Pub. Date: Jul. 17, 2014

(65) Prior Publication Data
US 2015/0358448 A1    Dec. 10, 2015

(30) Foreign Application Priority Data

Jan. 8, 2013  (KR) .................. 10-2013-0001848
Jul. 15, 2013 (KR) .................. 10-2013-0082923

(51) Int. Cl.
*H04M 1/57*       (2006.01)
*H04M 1/725*      (2006.01)
*H04M 19/04*      (2006.01)

(52) U.S. Cl.
CPC ....... *H04M 1/575* (2013.01); *H04M 1/72519* (2013.01); *H04M 1/72522* (2013.01);
(Continued)

(58) Field of Classification Search
CPC .................................................. H04M 1/575
See application file for complete search history.

(56) References Cited

U.S. PATENT DOCUMENTS

| | | | | |
|---|---|---|---|---|
| 7,289,772 B1 * | 10/2007 | Bonansea | ............. | G06F 3/0481 455/566 |
| 2008/0303796 A1 * | 12/2008 | Fyke | ..................... | G06F 3/0236 345/173 |
| 2010/0162169 A1 * | 6/2010 | Skarp | .................... | G06F 3/0488 715/833 |
| 2010/0248788 A1 * | 9/2010 | Yook | ..................... | G06F 3/0481 455/566 |

(Continued)

FOREIGN PATENT DOCUMENTS

| | | |
|---|---|---|
| CN | 1655558 A | 8/2005 |
| JP | 2002-314650 | 10/2002 |

(Continued)

OTHER PUBLICATIONS

English Translation of 10-2005-0081081.
(Continued)

*Primary Examiner* — Tuan H Nguyen
(74) *Attorney, Agent, or Firm* — Antonio Ha & U.S. Patent, LLC

(57) ABSTRACT

Disclosed are a mobile communication terminal for receiving a call while running an application and a method for same according to the present invention. The present invention provides the mobile communication terminal for receiving a call while running the application and the method for same, comprising: an input portion for receiving inputted information according to an operation of a key or a menu by a user; a control portion for running the application for an additional function according to the inputted information that is received, and controlling so that when an incoming signal is received, a call reception window indicating call connection status information with respect to the incoming signal is displayed on a portion of an additional function running screen; and a display for receiving a control signal from the control portion and displaying same on the screen, wherein the call reception window is displayed on the portion of the screen from which the application is run when the incoming signal is received while running the application for the additional function, thereby allowing continuous (Continued)

use of the additional function without disruption of application use due to receiving a call, and allowing control of call-related functions by using the call reception window so that the call-related functions can be controlled even while using another application.

19 Claims, 8 Drawing Sheets

(52) U.S. Cl.
CPC ........ *H04M 19/04* (2013.01); *H04M 1/72561* (2013.01); *H04M 2250/66* (2013.01)

(56) References Cited

U.S. PATENT DOCUMENTS

2011/0181538 A1* 7/2011 Aono ............... G06F 3/016
345/173

FOREIGN PATENT DOCUMENTS

| | | |
|---|---|---|
| KR | 10-2005-0030703 | 3/2005 |
| KR | 10-2005-0081081 | 8/2005 |
| KR | 10-2011-0084624 | 7/2011 |
| KR | 2011-0084624 | 7/2011 |

OTHER PUBLICATIONS

English Abstract of 2002-314650.
English Translation of 10-2005-0030703.
English Translation of 10-2011-0084624.
English translation of 1655558A.
English translation of 2011-0084624.
English translation of 2002-314650.

* cited by examiner

MOBILE COMMUNICATION TERMINAL FOR RECEIVING CALL WHILE RUNNING APPLICATION AND METHOD FOR SAME

TECHNICAL FIELD

The present invention relates to mobile communication terminals and methods for controlling the same, and more particularly, to mobile communication terminals for receiving a call while an application is running, which enable display of call connection information, call reception, and call-related control without interfering with an application for an additional function while the application for the additional function is running and methods thereof.

DISCUSSION OF RELATED ART

With the rapid development of technology, recent mobile communication terminals may provide various additional functions of, e.g., a camera, a movie player, a television (TV), or navigation, as well as simply transmitting voice information or text messages.

However, the conventional mobile communication terminal, when receiving a call while an application is running through an additional function, terminates the running application or switches the overall screen to a call reception screen. Further, although a call connection is terminated, the application should be restarted, or even when the application is not terminated, several steps should be taken to run the application.

Further, in the above scenario where the several steps are performed to run the application while a call connection is made, turning back to the call reception screen is required to conduct call-related control (e.g., recording the call or switching to a speaker phone).

In other words, the display of a screen of the application for additional functions and the call-related control cannot be simultaneously performed. Accordingly, a few steps need to be taken to switch screens, thus increasing inconvenience in use. While an application, such as a navigation application, is in use, the user's manipulation of the several steps might not be easy and may cause an accident.

SUMMARY

To address the problems of the conventional art, an object of the present invention is to provide a mobile communication terminal and method for receiving a call while an application is running, which, when receiving an incoming call while an application for an additional function is running, enable display, on a portion of the screen where the application is running, a call reception window displaying reception information and call connection state information without interfering with the application.

Another object of the present invention is to provide a mobile communication terminal and method for receiving a call while an application is running, which enable control of call-related functions using the call reception window so that various call functions, including, e.g., receiving or hanging up the call, may be controlled.

However, the present invention is not limited to the foregoing objects, and other objects will be apparent to one of ordinary skill in the art from the following detailed description.

To achieve the above objects, according to the present invention, a mobile communication terminal for receiving a call while an application is running may comprise an input unit receiving information as a user manipulates a key or a menu; a controller running an application for an additional function according to the received information and performing control so that, when an incoming call is received, a call reception window indicating call connection state information for the incoming call is displayed on a portion of a screen where the additional function is run; and a display unit receiving a control signal from the controller and performing display on a screen.

The controller may run the application for the additional function according to the received information and perform control so that, when the incoming call is received, the call reception window is displayed, overlaid on the screen where the additional function is run. For example, the call reception window may be formed of a call reception bar positioned at an edge of the application running screen.

Further, the controller may run an application for an additional function according to inputted information, and the controller, upon reception of an incoming call, may split the screen where the additional function is running so that call connection state information for the incoming call may be displayed.

Further, when the incoming call is received, the controller may perform control to display call reception screen for a predetermined time, and when the predetermined time elapses or when a call is received, may perform control so that the call reception window is overlaid on a predetermined portion of the screen where the additional function is run. Here, the predetermined time may be preferably set to be within one second to three seconds during which a user may identify that a call is received.

Further, the controller may perform control so that the call reception window is displayed in different colors for when the incoming call is received and when the incoming call is connected.

Further, the controller may perform control so that a background of the call reception window providing the call connection state information may be adjusted according to the user's selection.

Further, the controller may perform control so that a degree of transparency of the call reception window providing the call connection state information may be adjusted.

Further, the controller may perform different types of control by receiving an input signal obtained by touching the call reception window or a direction in which the call reception window is slid while touched. For example, the controller may perform control to switch to a normal mode, but not a speaker phone mode, when receiving a signal obtained by sliding the call reception window in a left or right direction, with the call reception window touched. Further, the controller may perform control to activate a call recording function to enable call recording when receiving a signal obtained by sliding the call reception window in an upper or lower direction, with the call reception window touched.

Meanwhile, the call connection state information may include at least one of an opposite party's phone number, name, picture, company name, or call time corresponding to the incoming call.

According to another aspect of the present invention, a method for receiving a call while an application is running may comprise receiving information according to manipulation of a key or menu of a user to run an application for an additional function and displaying a call reception window providing call connection state information on a portion of a screen where the application is running when an incoming call is received while the application is running.

displaying the call reception window may further include displaying a call reception screen for a predetermined time when the incoming call is received. Here, the predetermined time may be preferably set to be within one second to three seconds during which a user may identify that a call is received.

Further, displaying the call reception window may perform control so that call connection state information for the incoming call is displayed, overlaid on the screen where the additional function is run. For example, the call reception window may be provided in the form of a call reception bar positioned at an edge of the application running screen.

Further, displaying the call reception window may perform control to split the screen where the additional function is run so that the call connection state information for the incoming call is displayed on the split screen.

Meanwhile, the call reception window may be displayed in different colors for when the incoming call is received and when the incoming call is connected.

A background of the call reception window may be adjusted according to the user's selection.

Further, displaying the call reception window may perform different types of control by receiving an input signal obtained by touching the call reception window or a direction in which the call reception window is slid while touched. For example, control may be performed so that, when receiving a signal obtained by sliding the call reception window in a left direction, with the call reception window touched, a switch is made to a mode in which a call may be performed by a receiver, not by a speaker phone. Further, control may be performed so that, when receiving a signal obtained by sliding the call reception window in an upper or lower direction, with the call reception window touched, an operation is performed in a call recording mode.

Meanwhile, the call connection state information may include at least one of an opposite party's phone number, name, picture, company name, or call time corresponding to the incoming call.

Accordingly, the present invention enables a call reception window displaying reception information and call connection state information to be displayed on a portion of the screen wherein an application for an additional function is running when an incoming call is received while the application is running, enabling continuous use of the additional function by preventing the call reception from interfering with the use of the running application.

Further, the present invention enables easier control of call-related functions by inputting a signal obtained by touching or sliding the call reception window, allowing the call-related functions to be controlled even without screen change.

Further, the present invention enables the receiving state of an incoming call to be quickly known by switching and maintaining the call reception screen for a predetermined time when an application for an additional function is running, and when the predetermined time elapses or when the call connection is received, switching to the application running screen while displaying the call connection state information on a portion of the screen where the application is running.

DETAILED DESCRIPTION OF EXEMPLARY EMBODIMENTS

Hereinafter, mobile communication terminals and methods for receiving a call while an application is running according to embodiments of the present invention are described with reference to the accompanying drawings. The detailed description primarily focuses on parts necessary for understanding operations and actions according to the present invention. The same reference denotations may be used to refer to the same elements throughout the specification and the drawings. When determined to make the subject matter of the present invention unclear, the detailed description of the known art or functions may be omitted.

In particular, according to the present invention, there is proposed a new scheme in which, when an incoming call is received while an application for various additional functions is running, 1) a call reception window displaying call connection state information is displayed overlaid on a screen on which the application is running or 2) the screen on which the application is running is split into two portions so that the running application is displayed on one of the two portions of the screen, and the call connection state information is displayed on the other of the two portions of the screen.

Further, according to the present invention, there is proposed a new scheme that enables control of a call function using the call reception window displayed on the application running screen.

Figure 1:
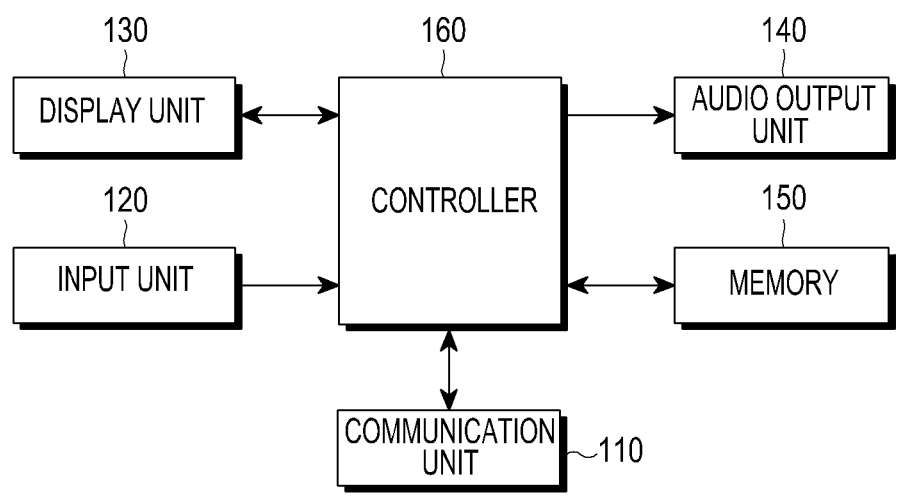
FIG. 1 is a block diagram illustrating a mobile communication terminal for receiving a call while an application is running according to an embodiment of the present invention.

FIG. 1 is a block diagram illustrating a mobile communication terminal for receiving a call while an application is running according to an embodiment of the present invention.

As used herein, the term "mobile communication terminal" may collectively mean a device that may receive a mobile communication service using a mobile communication network, such as, e.g., a mobile phone, a smartphone, tablet personal computer (PC), a laptop computer, or a personal digital assistant (PDA).

Referring to FIG. 1, the mobile communication terminal for receiving a call while an application is running, according to an embodiment of the present invention, may include a communication unit 110, an input unit 120, a display unit 130, an audio output unit 140, a memory 150, and a controller 160.

The communication unit 110 may transmit an outgoing call to an opposite party's mobile communication terminal or may receive an incoming call from the opposite party's mobile communication terminal. The communication unit 110 may communicate voices according to a call connection.

The input unit 120 may receive information by a user's key or menu manipulation. For example, the input unit 120 may enable an input by allowing the display unit to be directly touched using a touchscreen. The user may input whether to run various applications for additional functions through the input unit 120, and when an incoming call is received while the application is running, the user may set an incoming call reception function to display information related to the incoming call. Further, an input for controlling call-related functions while in a call connection state may be performed.

In this case, the additional functions may include, e.g., a navigation function, a digital multimedia broadcasting (DMB) function, a game function, and an internet search function. Such additional functions may be functions that may be installed upon manufacture of the mobile communication terminal or may be downloaded and installed while in use.

The display unit 130 may receive a signal from the controller 160 to display video data related to the running application. In particular, when an incoming call is received while the application is running, the display unit 130 may display a call reception window providing call connection state information on a portion of the screen where the application is running in response to a control signal from the controller 160. For example, the display unit 130 may display a call reception screen for a predetermined time, and after the predetermined time, may display a call reception window providing call connection state information, overlaid on the screen where the application is running. As another example, the display unit 130 may display the call reception screen for a predetermined time, and after the predetermined time, may split the screen where the application is running into two portions and display the application on one of the two portions of the screen while displaying the call connection state information on the other portion of the screen. Meanwhile, the degree of transparency of the call reception window may be adjusted. For example, the call reception window may be adjusted through an adjustment bar so that the call reception window and contents in the call reception window become transparent or opaque. In this case, the adjustment bar may be rendered to be displayed by a signal generated by a touch input to the call reception window. Further, the adjustment bar may be rendered to be displayed on a screen for setting the call reception window, so that the user may perform the adjustment.

The audio output unit 140 may output voices or audios provided from various running applications for additional functions.

The memory 150 may store applications for additional functions, a contacts list, images or videos.

The controller 160 may control the operation of the mobile communication terminal. The controller 160 may perform control to run various applications for additional functions, to receive audio or video data from the various applications, and to output the received audio or video data to the display unit 130 and the audio output unit 140.

In particular, when receiving an incoming call while an application is running, the controller 160 may provide call connection state information without affecting the running application. Here, the call connection state information may be provided in the form of a call reception window including, e.g., an opposite party's phone number or name, a picture, a company name, and a call time.

Preferably, the controller 160, when receiving an incoming call while an application is running, may perform control so that the call connection state information is displayed on a portion of the screen where the application is running. For example, the controller 160 may display a call reception window providing call connection state information, overlaid on a portion of the screen where the application is running. As another example, the controller 140 may perform control to split the screen where the application is running into two portions and to display the application on one of the two portions of the screen and the call connection state information on the other of the two portions of the screen.

Further, when an incoming call is received while an application is running, the controller 160 may perform control to display a call reception screen for a predetermined time, and after the predetermined time, to display a call reception window on a portion of the screen where the application is running.

Meanwhile, the controller 160 may perform control to receive an input signal according to a touch on the call reception window or an input signal according to a direction in which the touched call reception window slides and to control a call function according to the input signal. For example, the controller 160 may perform control to connect a call or terminate a call connection through a signal obtained by touching the call reception window. Further, upon receiving a signal obtained by sliding the call reception window in a left or right direction, with the call reception window touched, the controller 160 may perform control to switch to a speaker phone mode or a normal mode. Further, upon receiving a signal obtained by sliding the call reception window in an upper or lower direction, with the call reception window touched, the controller 160 may perform control to activate a call recording function so that a call may be recorded. Meanwhile, the call reception window may be positioned at an edge of the screen in the form of a bar that is referred to as a call reception bar, and a call function may be controlled by sliding the call reception bar.

Figure 2:
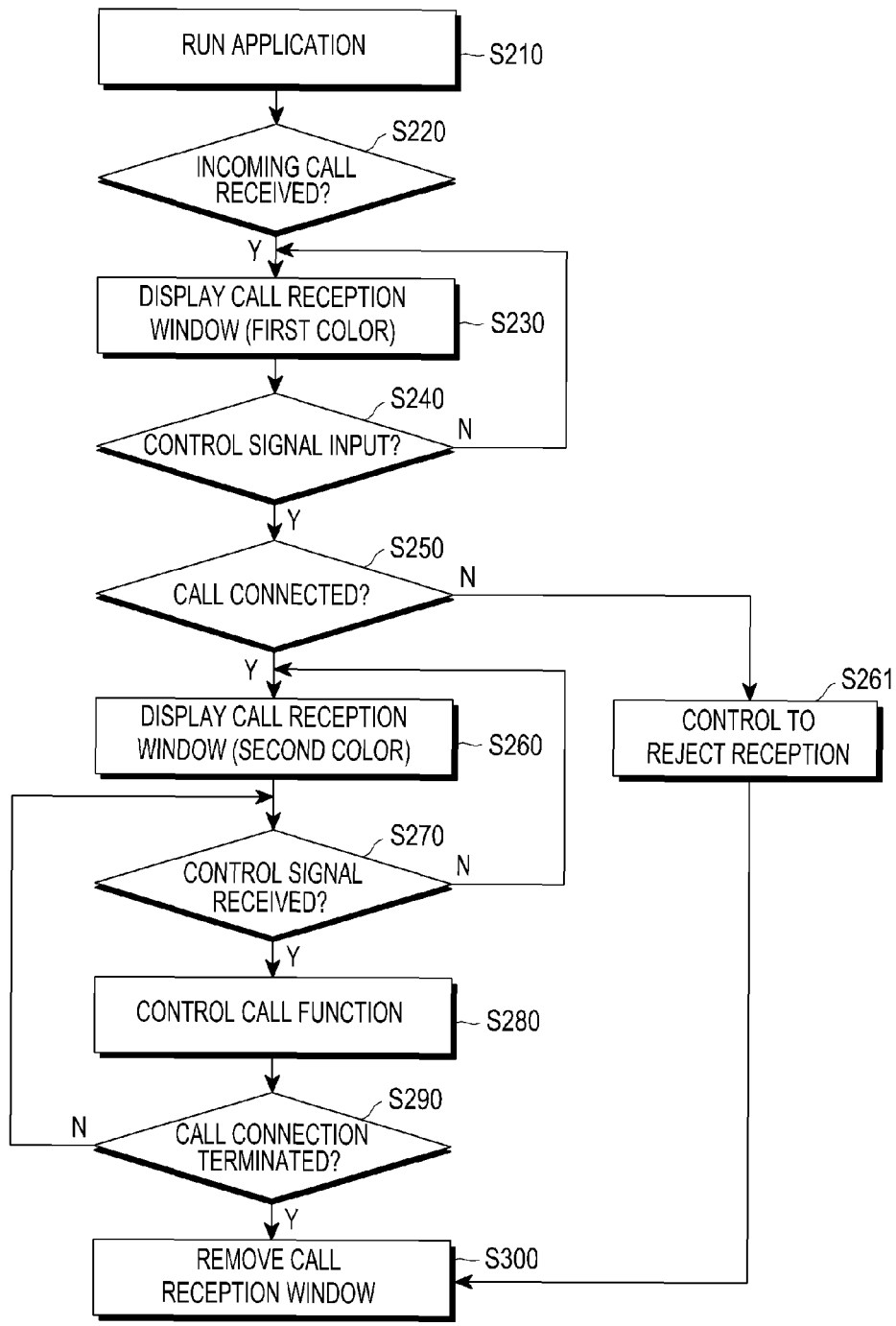
FIG. 2 is a flowchart illustrating a method for receiving a call while an application is running according to an embodiment of the present invention.

FIG. 2 is a flowchart illustrating a method for receiving a call while an application is running according to an embodiment of the present invention.

The present invention may largely include the step of receiving information according to a user's key or menu manipulation to run an application for an additional function and the step of displaying a call reception window providing call connection state information on a portion of a screen where the application is running when an incoming call is received while the application is running.

Hereinafter, the displaying step is described in greater detail with reference to the drawings.

Referring to FIG. 2, the mobile communication terminal according to the present invention, when the application for the additional function is run (S210), displays the screen where the application is running through the display unit.

Next, the controller identifies whether an incoming call is received (S220).

When an incoming call is received, the call reception window may be displayed on a portion of the application screen so that the call reception window is displayed in a first color indicating that a call is incoming or the first color flicks (S230). In this case, the call reception window may be transparently displayed so that an image or video preset as a background is shown or the application running screen is shown without any present image or video or so that an image or video corresponding to the incoming call is shown.

Meanwhile, the first color and a second color different from the first color may be used to distinguish when a call is incoming from while the call is connected. For example, a call incoming state and a call connected state may be distinguished from each other by changing the color of an edge of the call reception window or changing the color of a portion of the call reception window.

Further, the call reception window may have various shapes or forms. For example, the form of the call reception window may be displayed to be overlaid on the application running screen. As another example, a call reception bar positioned at an edge of the application running screen may be displayed overlaid. As still another example, the application running screen may be split so that the call reception window may be displayed on a portion of the split screen.

Meanwhile, when the incoming call is received, the call reception screen may be displayed for a predetermined time. After the predetermined time or when a call is received, a screen change may be made so that the call reception window may be displayed on a portion of the screen where the additional function is being run. As described above, when the call reception screen is displayed for a predetermined time, the user may quickly notice the incoming call.

Thereafter, it is identified whether a control signal is input for the reception of the incoming call (S240). When the control signal is for connecting the incoming call, the color of the call reception window is changed in color to the second color and displayed while connecting the call (S260). When the control signal is not for connecting the incoming call, control to reject the reception is performed (S261).

In other words, when the incoming call connection is selected, the call may be connected, and the call reception window may be displayed so that its color is changed to the second color to indicate the call connection (S260). For example, the mobile communication terminal connects a call with the opposite party's mobile communication terminal when touching the call reception window displayed to be overlaid.

In contrast, when the incoming call connection is not selected, control for the rejection of the reception input by the user is run (S261). The control for the rejection of reception may be performed in various ways. For example, a preset text message may be transmitted to the opposite party's mobile communication terminal that has sent the incoming call. For example, the mobile communication terminal may create a text message saying "Now I cannot take call" and may send the text message to the opposite party's mobile communication terminal. In this case, when the incoming call connection is not selected and thus the call reception window is removed, the mobile communication terminal may set a call reception reject state for the phone number corresponding to the incoming call. Meanwhile, when control is performed by sliding the call reception window while the incoming call is received, control may be performed to turn in the state of holding the reception.

Next, it is identified whether a control signal for controlling a call functions is received while the call is connected (S270). The control of the call function may perform control to connect a call or terminate a call connection through a signal obtained by touching the call reception window. Further, upon receiving a signal obtained by sliding the call reception window in a left or right direction, with the call reception window touched, control may be performed to allow a phone talk to proceed in a normal mode rather than in the speaker phone mode. Further, upon receiving a signal obtained by sliding the call reception window in an upper or lower direction, with the call reception window touched, the controller 160 may perform control to activate a call recording function so that a call may be recorded (S280).

Next, the mobile communication terminal may identify whether the call connection is terminated (S290), and when the call connection is terminated, remove the call reception window (S300) to display back the application running screen alone. That is, the mobile communication terminal allows the call reception window to disappear from the application screen when the call connection is terminated, e.g., when the opposite party hangs up the phone or upon pressing the call reception window to hang up the phone.

Figure 3:
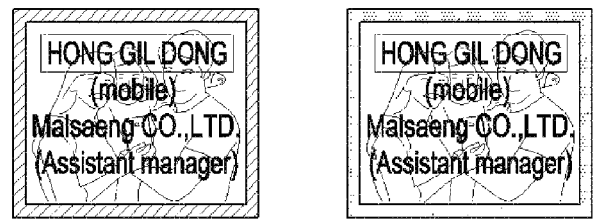
FIG. 3 is a view illustrating a shape of a call reception window according to an embodiment of the present invention.
Figure 3:
Figure 3:
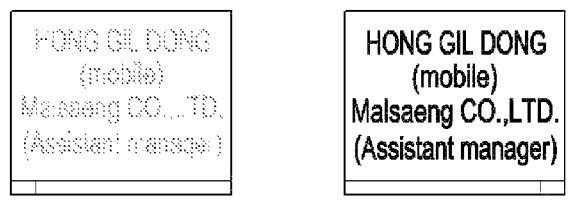

FIG. 3 is a view illustrating a shape of a call reception window according to an embodiment of the present invention.

As shown in FIG. 3, according to an embodiment of the present invention, the call reception window may set the call reception window to have different colors for when an incoming call is received and when the incoming call is connected as shown in FIG. 3(a) so that when the incoming call is received may be distinguished from when the incoming call is connected. For example, as shown in the figure, when an incoming call is received, an edge of the call reception window may be displayed in red, and when the incoming call is connected to turn in a call mode, the edge of the call reception window may be displayed in green to represent that the call is on the line. Further, while the incoming call is received, the edge of the call reception window may be displayed to flicker in more than one colors.

As shown in Fig. (b), the call reception window may be transparently displayed so that an image or video preset as a background is shown or a route directing screen is shown without any present image or video or so that an image or video corresponding to the incoming call is shown.

The degree of transparency of the call reception window may be adjusted as shown in FIG. 3(c). For example, the call reception window may be adjusted through an adjustment bar so that the call reception window and contents in the call reception window become transparent or opaque.

Hereinafter, a mobile communication terminal and method for receiving a call while an application is running are described in greater detail with reference to various embodiments of the present invention.

First Embodiment

Figure 4:
FIG. 4 is a view illustrating a screen of an incoming call receiving state on an application running screen according to a first embodiment of the present invention.
Figure 5:
FIG. 5 is a view illustrating a screen of a call connection state on an application running screen according to the first embodiment of the present invention.
Figure 6:
FIG. 6 is a view schematically illustrating a method for performing control in a call connection state on an application running screen according to the first embodiment of the present invention.

FIG. 4 is a view illustrating a screen of an incoming call receiving state on an application running screen according to a first embodiment of the present invention. FIG. 5 is a view illustrating a screen of a call connection state on an application running screen according to the first embodiment of the present invention. FIG. 6 is a view schematically illustrating a method for performing control in a call connection state on an application running screen according to the first embodiment of the present invention.

Referring to FIGS. 4 to 6, an application for an additional function may be run according to inputted information. Upon reception of an incoming call, a call reception window indicating call connection state information for the incoming call may be displayed, overlaid on a portion of a screen wherein the additional function is running.

That is, as shown in FIG. 4, when receiving the incoming call, the call reception window may be displayed, overlaid on the portion of the application running screen, indicating that the incoming call is being received. In this case, the call reception window may be transparently displayed so that an image or video preset as a background is shown or the application running screen is shown without any present image or video or so that an image or video corresponding to the incoming call is shown.

Meanwhile, a call function may be controlled through the call reception window. For example, when the user touches the call reception window while the incoming call is being received, a connection to an opposite party's mobile communication terminal is made. When the call is connected, the color of the call reception window is changed to indicate that the call is in progress.

Further, the call function may be controlled using the call reception window when the incoming call is being received or when the call is connected. For example, when the call reception window is slid while the incoming call is being received, a reception reject message may be sent out.

The above-described methods may be combined in various ways. In other words, a control rule different from the call connection controlling method may apply to reject the incoming call connection. When the incoming call is not connected by the above-described control, control for rejecting the reception is performed. For example, when the incoming call connection is rejected, a preset text message may be transmitted to the opposite party's mobile communication terminal that has sent the incoming call. That is, the mobile communication terminal may create a text message saying "Now I cannot take call" and may send the text message to the opposite party's mobile communication terminal.

Meanwhile, call-related control may be performed in a way to slide the call reception window while the call is connected. For example, upon receiving a signal obtained by sliding the call reception window in a left or right direction, with the call reception window touched, while in the call connected state, control may be performed to switch to speaker phone mode or a normal mode to allow a phone talk to proceed in the normal mode or the speaker phone mode. Further, upon receiving a signal obtained by sliding the call reception window in an upper or lower direction, with the call reception window touched, the controller 160 may perform control to activate a call recording function so that a call may be recorded.

Second Embodiment

Figure 7:
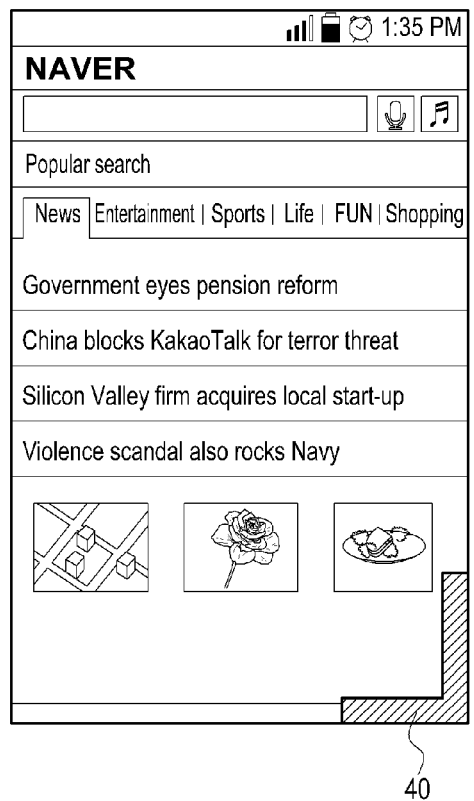
FIG. 7 is a view illustrating a screen of an incoming call receiving state on an application running screen according to a second embodiment of the present invention.
Figure 8:
FIG. 8 is a view illustrating a screen of a call connection state on an application running screen according to the second embodiment of the present invention.
Figure 9:
FIG. 9 is a view schematically illustrating a method for performing control in a call connection state on an application running screen according to the second embodiment of the present invention.
Figure 10:
FIG. 10 is a view illustrating a screen of an incoming call receiving state information displaying state on an application running screen according to the second embodiment of the present invention.

FIG. 7 is a view illustrating a screen of an incoming call receiving state on an application running screen according to a second embodiment of the present invention. FIG. 8 is a view illustrating a screen of a call connection state on an application running screen according to the second embodiment of the present invention. FIG. 9 is a view schematically illustrating a method for performing control in a call connection state on an application running screen according to the second embodiment of the present invention. FIG. 10 is a view illustrating a screen of an incoming call receiving state information displaying state on an application running screen according to the second embodiment of the present invention.

Referring to FIGS. 7 to 10, the call reception window of the first embodiment may be changed to a call reception bar and the call reception bar may apply. As shown in FIG. 7, the call reception window may be changed to the call reception bar shaped as a bar, and the call reception bar may be positioned at an edge of the screen. The control scheme applied to the call reception window may be used by sliding the call reception bar.

According to the second embodiment of the present invention, the call reception bar may be displayed at the edge of the application running screen, and the call reception bar may be displayed in different colors for when an incoming call is received and when the incoming call is connected, so that when the incoming call is received may be distinguished from when the incoming call is connected. For example, as shown in the figure, when an incoming call is received, the call reception bar may be displayed in red, and when the incoming call is connected, the call reception bar may be displayed in green to represent that the call is on the line. Further, while the incoming call is received, the call reception bar may be displayed to flicker in at least one or more colors.

Further, the call reception bar may be formed to surround an overall edge of the screen, and a call function may be controlled by sliding the edge in an upper or lower direction or in a left or right direction. Further, when the call reception bar is formed to surround the overall screen, the color change may be performed in the same manner as when only a portion of the call reception bar is formed. Further, the thickness of the call reception bar may be adjusted to provide call function control fitting the user.

Meanwhile, the call reception bar, unlike the call reception window, might not have an enough space to indicate call connection state information. Accordingly, as shown in FIG. 10, when an incoming call is received, call connection state information may be displayed on a portion of the application screen, and when the call is connected or rejected, the call connection state information may be rendered to disappear.

Third Embodiment

Figure 11:
FIG. 11 is a view illustrating a screen of an incoming call receiving state on an application running screen according to a third embodiment of the present invention.
Figure 12:
FIG. 12 is a view illustrating a screen of a call connection state on an application running screen according to the third embodiment of the present invention.
Figure 13:
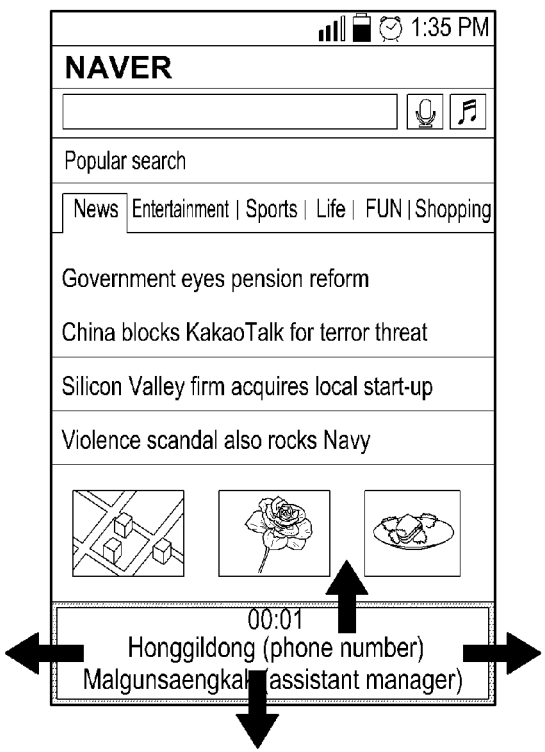
FIG. 13 is a view schematically illustrating a method for performing control in a call connection state on an application running screen according to the third embodiment of the present invention.

FIG. 11 is a view illustrating a screen of an incoming call receiving state on an application running screen according to a third embodiment of the present invention. FIG. 12 is a view illustrating a screen of a call connection state on an application running screen according to the third embodiment of the present invention. FIG. 13 is a view schematically illustrating a method for performing control in a call connection state on an application running screen according to the third embodiment of the present invention.

Referring to FIGS. 11 to 13, an application for an additional function may be run according to inputted information. Upon reception of an incoming call, the screen where the additional function is running may be split, and call connection state information for the incoming call may be displayed.

In other words, when an incoming call is received, the screen may be split into a first portion and a second portion, and the application screen is displayed on the first portion and the call connection state information, e.g., the opposite party's phone number or name, may be displayed on the second portion to indicate that the call is being received. In this case, an image or video preset as a background or an image or video corresponding to the incoming call may be displayed on the second portion. Further, the color of the second portion may be changed, or an edge of the second portion or the overall second portion may be displayed to flicker.

Meanwhile, a call function may be controlled through the second portion. For example, when the user touches the second portion while the incoming call is being received, a connection to an opposite party's mobile communication terminal is made. When the call is connected, call connection state information indicating the content "the call is in progress" or a call time may be displayed to indicate that the call is on the line.

Further, when the second portion is slid while the incoming call is being received, a reception reject message may be sent out. For example, the above-described methods may be combined in various ways. In other words, a control rule different from the call connection controlling method may apply to reject the incoming call connection. When the incoming call is not connected by the above-described control, control for rejecting the reception is performed. For example, when the incoming call connection is rejected, a preset text message may be transmitted to the opposite party's mobile communication terminal that has sent the incoming call. That is, the mobile communication terminal may create a text message saying "Now I cannot take call" and may send the text message to the opposite party's mobile communication terminal.

Meanwhile, the second portion, like the call reception window, may also use colors to indicate that the call is in progress or that the call is being received. All of the functions of the call reception window may be included in the first portion, and the control through touching or sliding the call reception window may apply as well.

Meanwhile, the above-described embodiments of the present invention may be created in a program executable on a computer and may be implemented in a general-purpose digital computer operating the program using computer-readable recording medium. The computer-readable recording medium includes a storage medium, such as a magnetic storage medium (e.g., a ROM, a floppy disc, or a hard disc) or an optical reading medium (e.g., a CD-ROM or a DVD).

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A mobile communication terminal for receiving a call while an application is running, the mobile communication terminal comprising: an input unit receiving information as a user manipulates a key or a menu; a controller running an application for an additional function according to the received Information and performing control so that, when an incoming call is received, a call reception window including call connection state information for the incoming call is displayed on a portion of an application running screen that is separated from a status bar and performing different types of control by receiving an input signal obtained by touching the call reception window or a direction in winch the call reception window is slid while touched; and a display unit receiving a control signal front the controller and performing display on a screen, wherein the call connection state information includes information on an opposite party making the incoming call; and wherein the controller run the application for the additional function according to the received information and performs control so that, when the incoming call is received, the call reception window is displayed, overlaid on the screen where the additional function is run.

2. The mobile communication terminal of claim 1, wherein the call reception window is formed of a call reception bar positioned at an edge of entire application, running screen.

3. The mobile communication terminal of claim 1, wherein the controller runs the application for the additional function according to the received information and performs control to, when the incoming call is received, split the screen where the additional function is run and display the call connection state information for the incoming call.

4. The mobile communication terminal of claim 1, wherein when the incoming call is received, the controller displays a call reception screen for a predetermined time, and when the predetermined time elapses or when a call is received, performs switch so that the call reception window is overlaid on a predetermined portion of the screen where the additional function is run.

5. The mobile communication terminal of claim 1, wherein the controller performs control so that the call reception window is displayed in different colors for when the incoming call is received and when the incoming call is connected.

6. The mobile communication terminal of claim 1, wherein the controller performs control so that a background of the call reception window providing the call connection state information may be adjusted according to the user's selection.

7. The mobile communication terminal of claim 1, wherein the controller performs control so that a degree of transparency of the call reception window providing the call connection state information may be adjusted.

8. The mobile communication terminal of claim 1, wherein the controller performs control to switch to a normal mode, but not a speaker phone mode, when receiving a signal obtained by sliding the call reception window in a left or right direction, with the call reception window touched.

9. The mobile communication terminal of claim 1, wherein the controller performs control to activate a call recording function to enable call recording when receiving a signal obtained by sliding the call reception window in an upper or lower direction, with the call reception window touched.

10. The mobile communication terminal of claim 1, wherein the call connection state information includes at least one of the opposite party's phone number, name, picture, company name, or call time corresponding to the incoming call.

11. A method for receiving a call while an application is running, the method comprising: receiving information according to manipulation of a key or menu of a user to run an application for an additional function and displaying a call reception window providing call connection state information on a portion of and application running screen that is separated from a status bar when an incoming call is received while the application is running and receiving an input signal according to a touch on the call reception window or a direction in which the call reception window is slid while touched to perform control according to the input signal, wherein the call connection state information includes information on an opposite party making the incoming call; and wherein displaying the call reception window is performing control so that call connection state information for the incoming call is displayed overlaid on the screen where the additional function is run.

12. The method of claim 11, wherein displaying the call reception window further includes displaying a call reception screen for a predetermined time when the incoming call is received.

13. The method of claim 11, wherein the call reception window is formed of a call reception bar positioned at an edge of the application running screen.

14. The method of claim 11, wherein displaying the call reception window is performing control to split the screen where the additional function is run so that the call connection state information for the incoming call is displayed on the split screen.

15. The method of claim 11, wherein the call reception window is displayed in different colors for when the incoming call is received and when the incoming call is connected.

16. The method of claim 10, wherein a background of the call reception window may be adjusted according to the user's selection.

17. The method of claim 11, wherein control is performed so that, when receiving a signal obtained by sliding the call reception window in a left direction, with the call reception window touched, a switch is made to a mode in which a call may be performed by a receiver, not by a speaker phone.

18. The method of claim 11, wherein control is performed so that, when receiving a signal obtained by sliding the call reception window in an upper or lower direction, with the call reception window touched, an operation is performed in a call recording mode.

19. A method for controlling an electronic device, the method comprising: receiving a call through the electronic device while an application is being run and displayed by the electronic device; and when receiving the call, displaying and overlaid a call reception window including information regarding the call on a portion of an application running screen that is separated from a status bar of the electronic device while the application is being run and displayed by the electronic device, wherein the information regarding the call includes text information regarding a caller who makes the call and call connection state information.

\* \* \* \* \*

UNITED STATES PATENT AND TRADEMARK OFFICE
CERTIFICATE OF CORRECTION

| | | |
|---|---|---|
| PATENT NO. | : 9,674,329 B2 | Page 1 of 1 |
| APPLICATION NO. | : 14/759652 | |
| DATED | : June 6, 2017 | |
| INVENTOR(S) | : Han Uk Jeong et al. | |

It is certified that error appears in the above-identified patent and that said Letters Patent is hereby corrected as shown below:

In the Claims

Column 12, Claim 1, Line 7, please replace "front" with -- from --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*